(12) United States Patent
Trench

(10) Patent No.: US 7,539,861 B2
(45) Date of Patent: May 26, 2009

(54) CREATING AND STORING ONE OR MORE DIGITAL CERTIFICATES ASSIGNED TO SUBSCRIBER FOR EFFICIENT ACCESS USING A CHIP CARD

(75) Inventor: Terence V. Trench, San Francisco, CA (US)

(73) Assignee: Visa International Service Association, Foster City, CA (US)

( * ) Notice: Subject to any disclaimer, the term of this patent is extended or adjusted under 35 U.S.C. 154(b) by 99 days.

(21) Appl. No.: 11/044,882

(22) Filed: Jan. 27, 2005

(65) Prior Publication Data

US 2005/0154877 A1 Jul. 14, 2005

Related U.S. Application Data

(63) Continuation of application No. 09/590,438, filed on Jun. 9, 2000, now abandoned.

(60) Provisional application No. 60/161,706, filed on Oct. 27, 1999.

(51) Int. Cl.
*H04L 9/30* (2006.01)

(52) U.S. Cl. ................ 713/157; 713/155; 713/156; 713/176; 713/177

(58) Field of Classification Search .......... 713/156, 713/157, 172
See application file for complete search history.

(56) References Cited

U.S. PATENT DOCUMENTS

| 5,434,395 | A | * | 7/1995 | Storck et al. ........... 235/380 |
| 5,659,616 | A | | 8/1997 | Sudia |
| 5,778,072 | A | * | 7/1998 | Samar ................... 380/30 |
| 5,796,840 | A | | 8/1998 | Davis |
| 5,970,147 | A | | 10/1999 | Davis |
| 6,044,349 | A | * | 3/2000 | Tolopka et al. ........... 705/1 |

FOREIGN PATENT DOCUMENTS

EP 0782296 A2 7/1997

OTHER PUBLICATIONS

Stallings, William; Cryptography and Networks Security; 2nd Edition; Jun. 4, 1998; Prentice Hall, Inc.; Chapters 8 and 11.*

(Continued)

*Primary Examiner*—Jung Kim
(74) *Attorney, Agent, or Firm*—Bradley K. DeSandro; Quarles & Brady LLP

(57) ABSTRACT

A method for creating a digital certificate for a user issued by a reliant party, where the reliant party relies on an established cryptographic infrastructure by a registration or certificate authority is described. The registration authority, typically a large financial or credit institution, has already performed the initial overhead steps necessary for a digital authentication system using a chip card. These steps include minting and distributing the chip card, establishing that the key pair and card are given to the right person, and creating the certificate library. The reliant party leverages this cryptographic infrastructure to issue its own digital certificate and certificate chain to a user already having a chip card from the registration authority. Consequently, a user can have additional digital certificates issued to him without having his chip card modified in any way. All additional digital certificates created for a user are stored at a user-specific memory are in a remote certificate library.

4 Claims, 6 Drawing Sheets

OTHER PUBLICATIONS

VeriSign Certificate Practice Statement; May 30, 1997.*

Ellison, Carl; "Generalized Certificates"; Sep. 12, 1996; pp. 1-8.*

Hughes, J., *Certificate Inter-Operability White Paper*, Business Development Director, Elsevier Science Ltd., Computers & Security, vol. 18, No. 3, pp. 221-230, 1999.

* cited by examiner

CREATING AND STORING ONE OR MORE DIGITAL CERTIFICATES ASSIGNED TO SUBSCRIBER FOR EFFICIENT ACCESS USING A CHIP CARD

CROSS-REFERENCE TO RELATED APPLICATIONS

This application claims priority of provisional patent application entitled "Certificate Store Proposal", assigned Ser. No. 60/161,706, and filed Oct. 27, 1999 and is a continuation of the patent application entitled "Creating and Storing One or More Digital Certificates Assigned to a Subscriber for Efficient Access Using a Chip Card," assigned Ser. No. 09/590,438, and filed Jun. 9, 2000 now abandoned.

BACKGROUND

The use of chip cards, such as the Visa Smart Card™, is on the rise. A chip card is assigned to a user by an entity which typically has a pre-existing relationship with the user. The chip card contains or has access to a digital certificate to authorize that user's relationship. Using a chip card to store the digital certificate and other information is an improvement over existing configurations in which the digital certificate is stored on the device, such as a PC, laptop, hand-held computer, mobile phone, and so on. By putting information on a chip card, the digital certificate is still secure but now portable. The chip card can now be used at stores, service providers (e.g., car rental agencies, hotels, airline ticket offices, public phones, laptop modem outlets, and the like), and, in the near future, public chip card readers for dispensing cash. Essentially, the card, and the user digital certificate, can be used to benefit both the user in terms of convenience and to the card/certificate issuer in terms of increased business at any location that has a chip card reader.

It is widely recognized in the chip card service industry that establishing and implementing the cryptographic infrastructure for wide-spread use of the chip card is expensive and difficult to manage for a vast majority of companies and organizations. This cryptographic infrastructure includes creating and distributing the chip cards to the users, verifying the identity of the users, and issuing digital certificates. Common standards for issuing and storing digital certificates include the Public Key Infrastructure and the DES shared key system. Establishing the initial framework and infrastructure is typically done by large banks and credit card organizations which have a large, established customer base whose members are already accustomed to carrying the bank's or organization's card.

Although there are ways to enable entities which do not have the means or financial power to establish their own infrastructure to use an existing infrastructure, these means typically require that steps be taken by the user and typically involve modifying the chip card. From a business perspective, this is impractical and has limited success since users generally do not respond to requests or offers to upgrade or modify chip cards. Furthermore, the memory available on chip cards for storing digital certificates is limited, and, therefore, can only accommodate a limited number of potential entities that can take advantage of the existing infrastructure.

Therefore, it would be desirable to be able to leverage an existing cryptographic infrastructure so that additional digital certificates can be accessed by one chip card without having to store additional data on the card. It would be desirable to do this without having to modify the chip card or notify and require actions taken by users of the chip cards. In other words, have additional digital certificates for a user added to the chip card and done so transparently to the user. The additional certificates should be capable of containing data signed by the entities leveraging the existing infrastructure. These entities should also be able to use their own trusted roots and not have to rely on the trusted root of the entity which laid down the existing cryptographic infrastructure.

SUMMARY

To achieve the foregoing, methods, apparatus, and computer-readable media are disclosed which provide a way for creating a digital certificate for a user issued by a reliant party, where the reliant party relies on an established cryptographic infrastructure by a registration or certificate authority. This registration authority, typically a large financial or credit institution, has already performed the initial overhead necessary for a digital authentication system using a chip card. These steps include minting and distributing the chip card, establishing that the key pair and card are given to the right person, and creating the certificate library. The reliant party leverages this cryptographic infrastructure to issue its own digital certificate and certificate chain to a user already having a chip card from the registration authority.

In one aspect of the invention, the reliant party derives a set of attributes for the user that is relevant to the reliant party. This attribute set is then signed by the reliant party using the party's private key. This encrypted attribute set, the non-encrypted attribute set, and a user public key are contained in a user certificate. The user public key has a corresponding user private key which is on the chip card. This public/private key pair was generated earlier by a card minter and distributed to the right individual by the registration authority. The newly created digital certificate, created by the reliant party, is stored in a certificate library and is identified by a unique identifier and other parameters as belonging to the reliant party. The user chip card contains an address to a memory segment in the certificate library. At that address are stored one or more digital certificates and certificate chains, all for a single card holder.

In another aspect of the invention, a method of authenticating a user presenting a chip card to an entity, such as a merchant or service provider, is described. A certificate library address is read from the chip card. At the certificate library, the entity provides additional parameters to identify a particular certificate needed by the entity to authenticate the user. Once the correct certificate is located it is returned to the reliant party so that they may authorize the card holder's attributes. The methods of traversing the certificate chain are known in the field. For example, one such certificate chain is a Public Key Infrastructure (PKI). Another cryptographic infrastructure can be based on a DES shared key system.

Advantageously, a reliant party can leverage an existing cryptographic infrastructure to implement its own digital certificates and certificate chains having its own trusted root. This can be done without modifying or adding data on the user chip card; that is, it can be done transparently to the user. The existing certificate library can be used to store a reasonably high number of certificates for one user. This frees a reliant party from having to use a registration authority's certificate chain and trusted root. Also, advantageously, the reliant party does not have to mint new chip cards or generate new public/private or shared secret keys for a user. It can simply use the keys already generated and distributed to the chip card holder.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

When two parties interact on the Internet or any type of physical or wireless network, authenticating or verifying the identity of the consumer is a critical factor. The process described below cannot proceed until it is first established that the user receiving a newly minted chip card is who she says she is. Once this is done, a party can produce a digital credential for the user. One way of issuing the user a digital certificate is to use the well-established Public Key Infrastructure (PKI).

A single PM is normally comprised of a certificate chain beginning with a user certificate ("user" is defined as consumer, client, or card owner/holder) which can reside either on the chip card or in a certificate library under the control of a certificate authority. Although the chip card may not contain the certificate, it does contain, among other data, the user's private key. The corresponding public key is contained in the user's digital certificate. As mentioned, this certificate, and its associated chain of certificates, can be stored on the card or in a certificate library. For the purposes of illustrating the described embodiment, it is assumed that the certificate chain is stored in a certificate library. The benefits of storing it in a certificate directory or library are described below.

Figure 1:
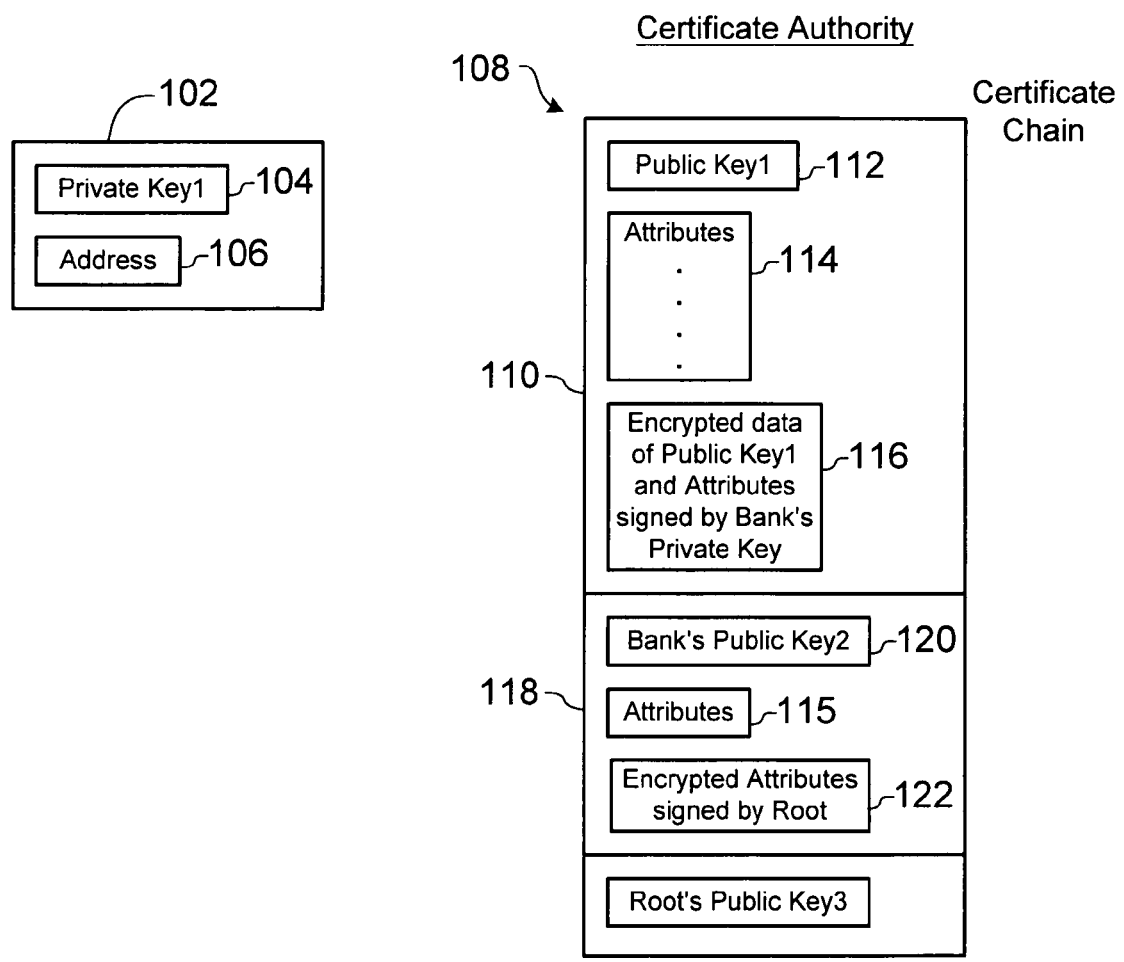
FIG. 1 is a diagram showing the various components of a single PKI.

FIG. 1 is a diagram showing the various components of a single PKI. Other standards such as shared-key DES can be used in place of PKI without significantly diverging from the present invention. A chip card 102 contains a user private key 104 and certificate library address identifier 106. The address is of a memory location in a certificate library (described below) which stores a certificate chain 108. A first certificate in certificate chain 108 is a user digital certificate 110 that contains a public key 112 corresponding to private key 104.

In the case of chip cards, this public/private key pair is generated by a key-generation program typically executed by a card minter at the card minter's premises. The keys are generated securely on the chip card itself in such a way that the private key cannot be removed. Neither the card minter nor the customer knows the value of the private key and neither have a need to know. The key is securely stored on the card and its value is unbeknownst to any party. However, the value of the public key is given to the certificate authority and need not be kept secret and stored on the user's digital certificate. This process of minting and distributing the chip card and keys are steps that must be taken initially to establish a cryptographic infrastructure.

User digital certificate 110 (the first certificate in chain 108) also contains attributes 114. This information is data on the user that is selected by and relevant to a particular registration authority, such as a bank, credit card company, airline, merchant, and the like. Some typical examples of attribute data 114 are user name, account number, registration authority or entity name (e.g., XYZ Bank, US Airline, Credit Card Company, etc.), and user date of birth. Essentially, it is data relating to the customer that the registration authority is willing to verify or back up. Also stored on consumer certificate 110 is an encrypted data segment 116. The data encrypted in data segment 116 tie attributes 114 to user public key 112 and thereby the user's private key in their possession. By encrypting data segment 116, it is being "signed" by the registration authority, for example, a Bank. The registration authority signs the data, in this example, attributes 114 and user public key 112, using the registration authority's private key (not shown) thereby creating encrypted data segment 116. Naturally, the registration authority has access to its own private key and is not contained in certificate chain 108.

A second certificate in certificate chain 108 is the Bank certificate 118 which has components similar to user digital certificate 110. Certificate 118 contains a Bank public key 120 and attributes 115, attributes that are relevant to another entity, such as a trusted root, having a certificate in certificate chain 108. An encrypted data segment 122 in Bank certificate 118 has attributes 115 that are encrypted or signed using a public key belonging to a trusted root, such as a banking association (e.g., Visa) or a government agency. This root is an entity that both the merchant and Bank trust in, simply, telling the truth about the identity of certain parties. The merchant may not necessarily trust the Bank in that it may not have complete confidence in the Bank's identity. However, the merchant does trust the root, and if the root is willing to verify the Bank's identity, the merchant will trust the Bank and ultimately the card holder.

There can be additional certificates belonging to other entities between the Bank and the root. The merchant can traverse up certificate chain 108, one certificate at a time, until it reaches an encrypted data segment signed by a root trusted by the merchant. The string of certificates, or certificate chain, and the configuration of the certificates described above are well-known in the field of digital signatures and certificates. A single certificate chain as described above can be referred to as one PKI as it authenticates one type of relationship, such as the banking relationship.

The verification process using the single PKI configuration described above starts with the user certificate and ends with a root certificate which the reliant party may or may not trust. A user gives her Bank chip card to a merchant for a purchase. Suppose the merchant is not an affiliate of the Bank and the merchant does not trust or, more specifically, does not recognize the Bank. Using certificate library address 106 on the card and additional parameters, such as an appropriate certificate identifier, the merchant gets access to certificate chain 108. It is assumed that the merchant has the necessary equipment, such as a chip card reader, and software to access and process digital certificates, such as the standard PKI or standard DES software. The merchant reads user public key 112, attributes 114, and encrypted data segment 116 in user certificate 110.

The merchant now needs to see who signed encrypted data segment 116. It does this by retrieving a public key from the second certificate in the chain; in the above example, this is Bank public key 120. Encrypted data segment 116 is decrypted using public key 120. If the resulting decrypted data segment matches the normal text of the public key and attributes in the first certificate, the merchant can go on to the next certificate in the chain. At this stage the merchant knows that at least the Bank has verified, essentially, that the user is who she says she is. But the merchant may not trust the Bank, so it continues up the chain.

The merchant looks at the next certificate, which may be from another untrusted entity. This entity has its public key in its certificate which the merchant can use to decrypt the encrypted segment in the Bank's certificate. If the decrypted segment matches the normal text of attributes 114 in the Bank certificate, the entity has verified, in a similar manner, that the Bank is who the Bank says it is. However, the merchant may not trust the entity, and continues down the certificate chain in a similar manner. At some point the merchant must trust some entity. This entity is referred to as the trusted root. When the merchant reaches the trusted root, it has traversed one PKI and the process of traversing the certificate chain stops.

The certificate of the root trusted by the merchant is contained in the PKI software that the merchant has in his system. At this stage, the merchant can present the user with a "challenge." A challenge is essentially a string of text chosen by the merchant. The user is then required to encrypt this challenge using her private key 104 on the chip card. The merchant then attempts to decrypt the data using the user's public key on the user certificate. If this is successful, the merchant can be assured that the user is the legitimate certificate holder and that the user certificate belongs to that user. The merchant can now confidently accept the chip card from the user for completing a transaction.

The certificate authority here is the entity that creates the card holder certificate chain under the control of a registration authority, such as the Bank. In some cases these two entities can be the same. The registration authority, being the entity that issues the chip card to the user through the card minter, has to perform some initial overhead before issuing the card to the user and laying down the cryptographic infrastructure described above. The registration authority must verify the identity of the user. By doing so it validates that the person holding private key 104 on chip card 102, that corresponds to public key 112 in user certificate, is, essentially, the right person. The registration authority typically has an existing relationship with the card holder to who it is issuing a chip card. The chip card needs to be delivered to the card holder in a trusted manner, for example, through certified mail.

This is an important "overhead" step that must be taken before the user is issued the chip card and a public/private key pair. The strength of user certificate 110 depends on the strength of this user identity verification performed at the time when the private key is issued (generally the same time the chip card is issued). By doing this, the registration authority is laying down a cryptographic infrastructure upon which the registration authority can build one PKI. Laying down this infrastructure and managing this life cycle, i.e., minting the chip card, issuing and storing the user certificate, verifying that the right person is receiving the chip card/user certificate, is an expensive and time-consuming process. Typically, operations of this scale are performed by large financial institutions having an established customer base, such as banks, credit card companies, credit unions, and large corporations.

The present invention is a method in which additional PKIs can be created using an existing cryptographic infrastructure as a foundation. This would allow for true and complete PKIs that can be used by smaller entities. By leveraging such an infrastructure, an entity can conduct their own certificate chain verification, as described above in the case of the Bank and merchant, using their own user attributes (different from attributes 114) and trusted root. If the cryptographic infrastructure laid down by the registration authority is to be leveraged, it is more practical to store all the certificate chains (PKIs) in a high-speed certificate library instead of on the chip card. This reduces the data needed on the card, eliminates the need to modify the card when adding new PKIs, and allows for a high number of certificates for a user.

The present invention allows a separate entity to develop its own PKI based on the registration authority's cryptographic infrastructure and verification of the user key pair. Since the user's public/private key has been verified, the user's public key can now be "signed," by the new entity with attributes that suit the new entity. By signing the user's public key and new set of attributes, the new entity is creating a new user certificate and, hence, a new PKI. Additional PKIs can be rapidly deployed to a user without having to modify the user's chip card. The additional certificate chains representing the new PKIs are simply stored in the certificate library at address 106 on the user chip card. Thus, the certificate library is leveraging the library address on the chip card.

Figure 2:
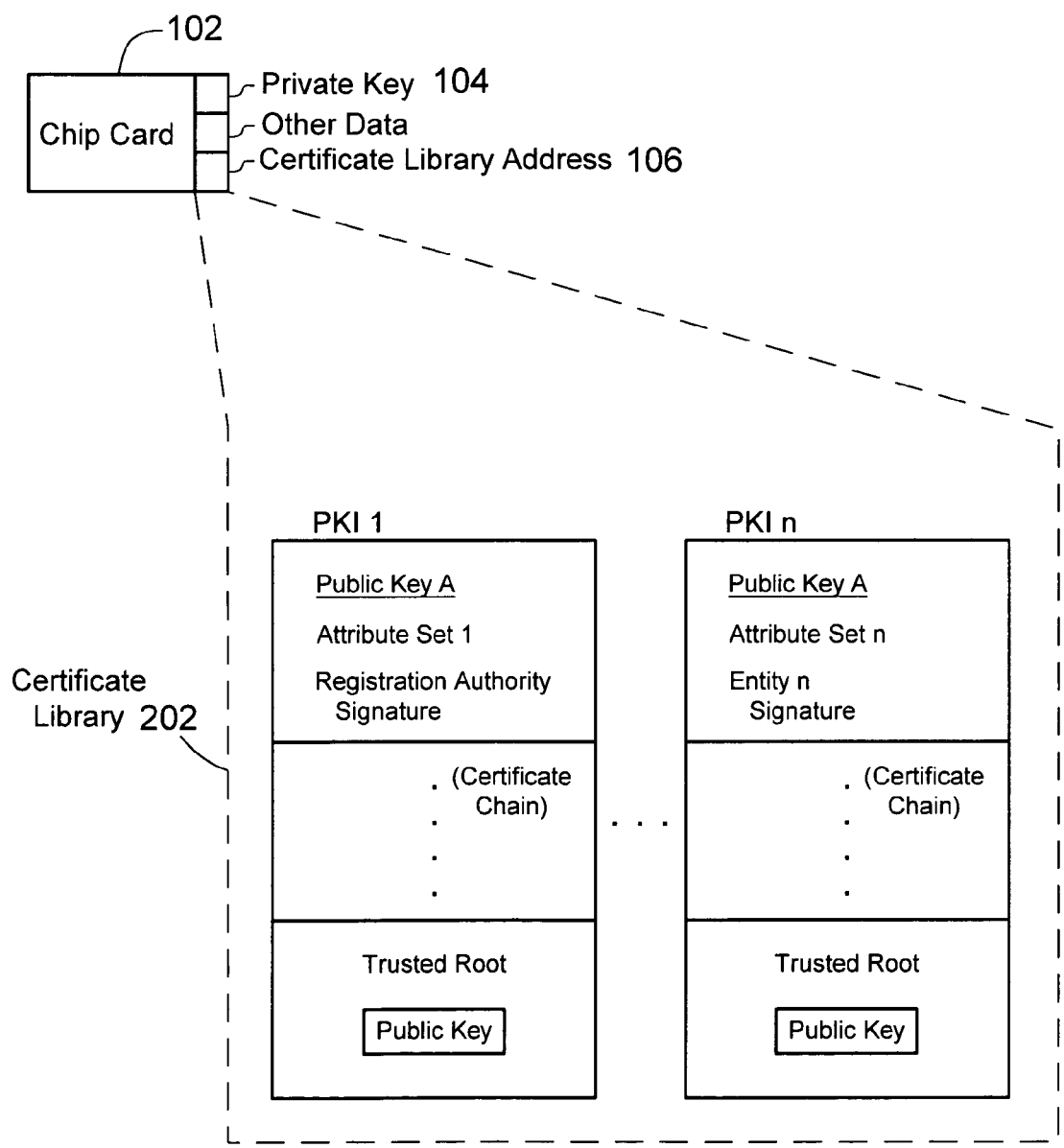
FIG. 2 is a diagram showing a single chip card having access to multiple PKIs in accordance with one embodiment of the present invention.

FIG. 2 is a diagram showing a single chip card having access to multiple PKIs. Chip card 102 stores a certificate library address 106 which can access a certificate library directory 202. At certificate library address 106 are stored multiple PKIs all having the same user public key, shown as Public Key A. As described above, Public Key A and corresponding private key 104 were verified initially to belong to the correct user by the registration authority. This is the initial overhead or due diligence performed by the registration authority. Any number n of PKIs can be added to certificate library directory 202. The trusted root in each PKI can be the same as or different from any other trusted root. The trusted root is established via a relationship between the entity creating the PKI and the root.

Figure 3:
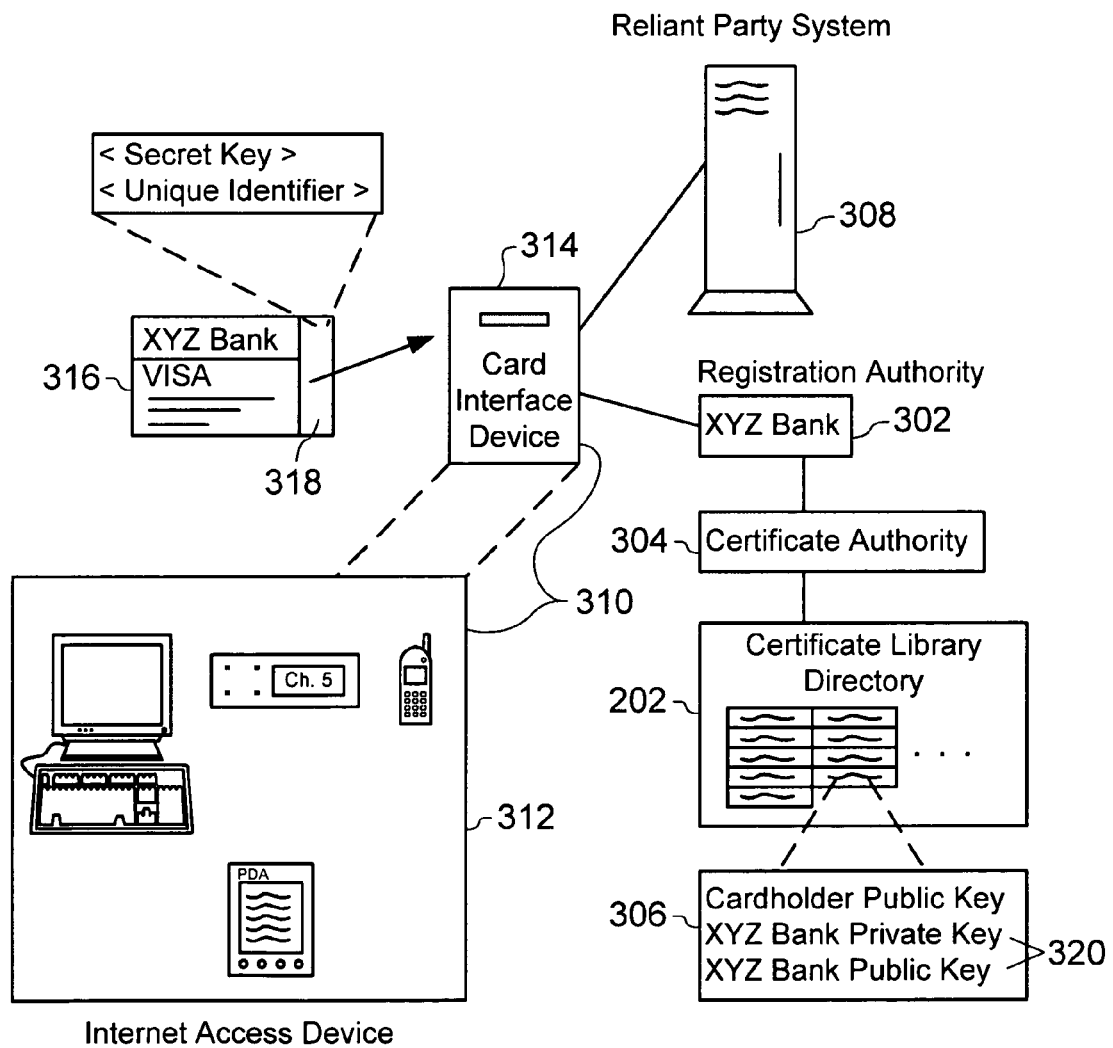
FIG. 3 is a diagram illustrating various components used in a certificate store configuration in accordance with one embodiment of the present invention.

FIG. 3 is a diagram illustrating various components used in a certificate store configuration in accordance with one embodiment of the present invention. A registration authority 302, such as the Bank in the above example, typically has a previously established relationship with a card holder. Registration authority 302 authorizes a certificate authority 304 to create a digital certificate 306 for authenticating a relationship as described above. Alternatively, the card holder can have a relationship with a reliant party 308, such as a merchant or service provider.

The card holder typically receives a chip card 316 through a trusted process, such as certified mail, via a card minter, from a registration authority, also referred to as a primary party. The card holder uses a card holder system 310 to interact with a reliant party 308, such as in a merchant store or at a PC. Card holder system 310 is any type of internet access device 312 coupled with a chip card interface device 314 capable of reading card 316. Internet access device 312 can be, for example, a PC, a set-top box, a cell phone, or a handheld computer. Chip card 316 contains an application 318 that can include a unique address for a memory location in a certificate library directory 202. Certificate store application 318 also includes a private key. The chip card can also be protected by a PIN or other method of cardholder verification.

Certificate authority 304 is an entity capable of generating and storing a user digital certificate and a certificate chain after receiving instructions from a registration authority or a reliant party. As described above, a private key is stored on chip card 316 by a card minter on behalf of a registration authority or a primary party. The public key and other attributes are signed by a certificate authority 304 (in many cases the same as the registration authority) to create a certificate 306 which is stored in a certificate library directory 202. In the described embodiment, certificate authority 304 communicates with the card minter and registration authority 302 through a proprietary protocol. In the described embodiment, communications with certificate library directory 202 are based on the Lightweight Directory Access Protocol (LDAP). The card minter generates the public/private key pair on the card and communicates with the certificate authority through a proprietary protocol. In the described embodiment, reliant party 308 uses LDAP to communicate with certificate library directory 202 and uses HTTPS to communicate with card holder system 210. As described above, card holder system 310 is a combination of hardware and software that includes chip card reader 314 used to connect to reliant party 308. Card holder system 310 (which can be mobile) facilitates communication between the card holder and reliant party 308 through EMV and HTTPS protocols.

As described above, reliant party 308 does not have to verify the correct identity of the card holder or lay down the cryptographic infrastructure necessary for a PKI. This has already been done by the primary party/registration authority. However, the reliant party, such as the merchant, does have to authenticate its own relationship with the card holder by signing her public key, thereby issuing the card holder a separate digital certificate and certificate chain. The reliant party must contract with the certificate authority to do so. In this way the reliant party can create new certificates without impacting the card holder, by borrowing the cryptographic infrastructure.

Certificate library directory 202 is an LDAP server able to store the certificate so that a reliant or primary party can authenticate a relationship between the party and a user exists. For example, a merchant can read an address on the card, access a memory location in the certificate library, and determine whether the card holder has a digital certificate issued by that merchant or recognizable to that merchant. In the described embodiment, certificate library directory 202 relies on LDAP to communicate with reliant party 308 and certificate authority 304. Chip card 316 can store credit, debit and other stored applications. Chip card 316 can also have "value added" applications to provide reliant party 308 and the user with other applications in addition to user authentication. Since chip cards are resource-constrained devices, it is desirable to minimize data on the chip card.

The certificate store configuration of the present invention offers the ability to support numerous PKIs using a single private key and certificate library address which combined make up approximately two kilobytes of memory on the chip card. As described above, certificate store application 318 on card 316 represents a private key and an address that links it to a digital certificate containing a public key in certificate library directory 202. If reliant party 308 wants to authenticate the card holder, it can access card application 318, request an appropriate certificate from certificate library directory 202 by appending LDAP query parameters to the address on the card, and traverse the certificate chain using the process described above. If the certificate exists, it is accessed so the reliant party or primary party can validate the card's private key. This process is described in greater detail below.

Figure 4A:
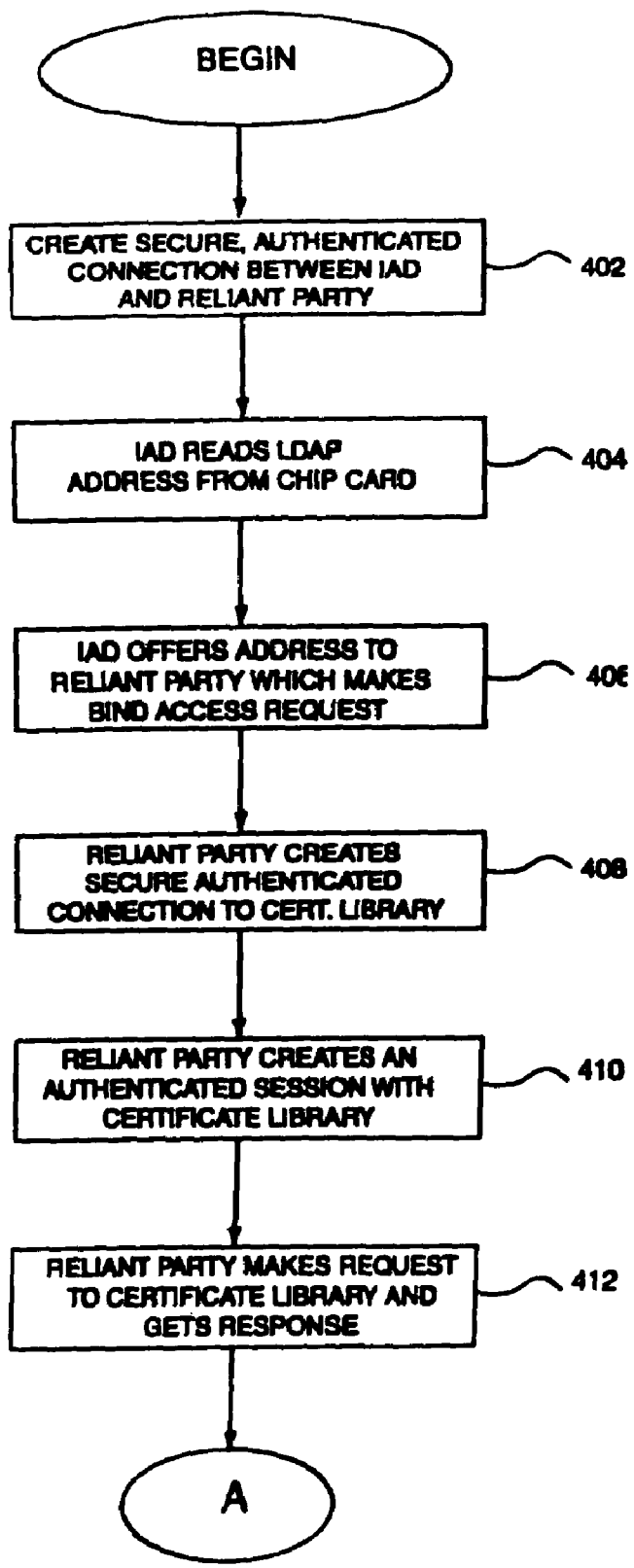
FIGS. 4A, 4B, and 4C are flow diagrams illustrating a process for establishing additional PKIs leveraging an existing cryptographic infrastructure and certificate store in accordance with the one embodiment in the present invention.
Figure 4B:
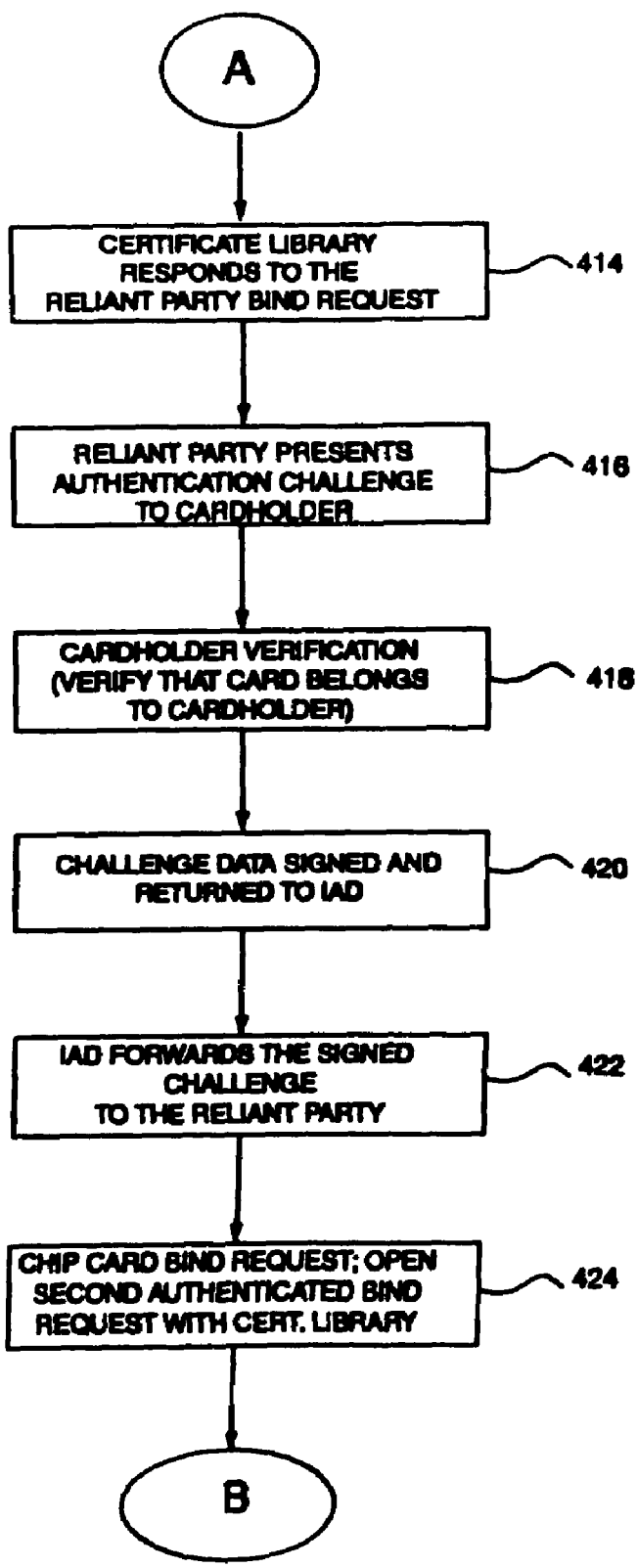
Figure 4C:
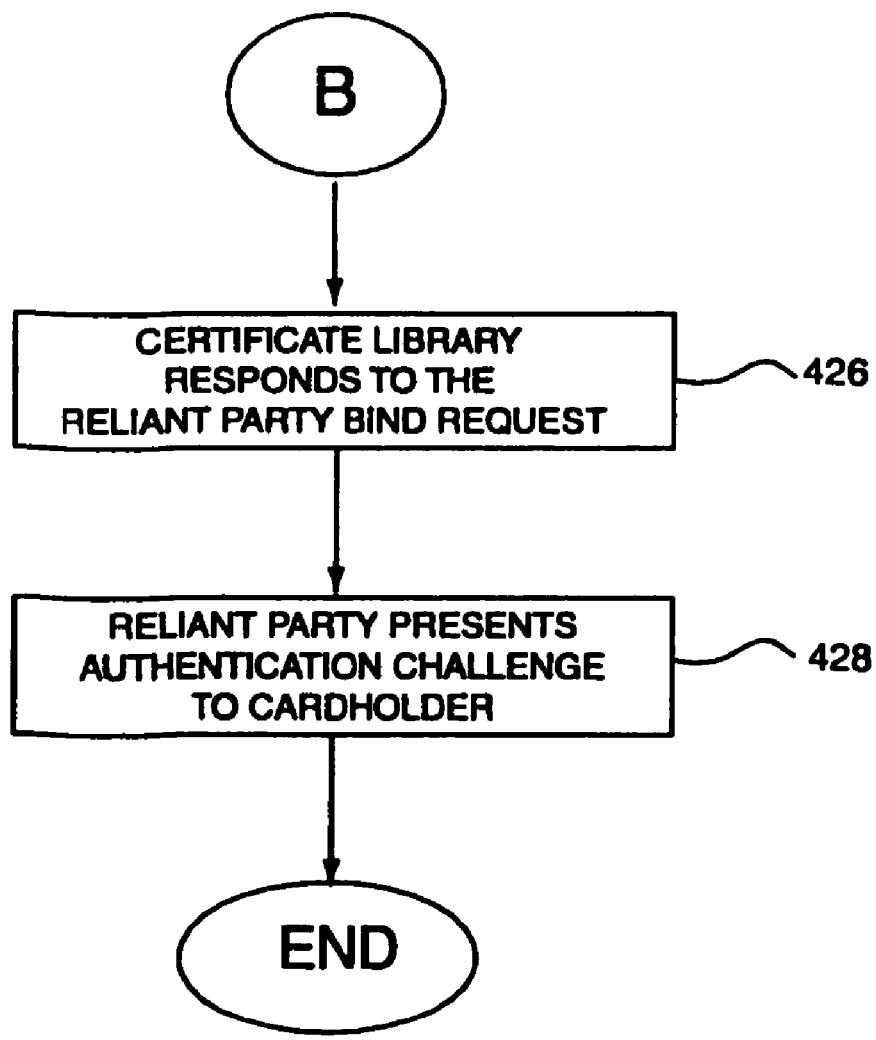

FIG. 4 is a flow diagram illustrating a process for establishing additional PKIs leveraging an existing cryptographic infrastructure and certificate store in accordance with the one embodiment in the present invention. The following assumptions are made: (1) a chip card has been issued to a card holder; (2) the card contains a private key; (3) a digital card holder certificate generated on behalf of the reliant party and issued by a registration authority is stored in a certificate library; and (4) the user has presented his card to a reliant party (e.g., an airline frequent flyer member is accessing a secure airline web site to access special services).

At a step 402, a secure, authenticated and dedicated connection between a reliant party, e.g., the airline, and an internet access device ("IAD") is established. This connection between the reliant party and IAD (not the user) can be an SSL Version 3 connection or a Transport Layer Security (TLS) connection. With SSL or TLS, the connection is secure thereby preventing other parties from eavesdropping. The reliant party can also have a certificate used by the IAD to authenticate the reliant party. In another preferred embodiment, greater control using SSL or TLS can be used with a card holder system certificate thereby ensuring that the request originated from a legitimate system. If the certificate library directory retains maximum control over the certificates, the chip card does not need to have an authentication certificate. If the reliant party can authenticate the card holder by checking the certificate library for the correct digital certificate each time the card holder access the reliant party, there is no requirement to expose a public key outside of the certificate library directory.

At step 404, once a secure and authenticated connection has been established between the IAD and the reliant party, the IAD accesses the chip card (through a card reader) to read the unique LDAP address for a certificate library from the card. The address can be in the following format:

LDAP://ldap.CertificateLibrary.com/
    o=MemberBank%20UniqueCardholderID

At step 406, the IAD, now in possession of the LDAP address, proceeds to contact the reliant party and requests access to a privileged service. It does so by first providing the reliant party with the LDAP address where the user's digital certificates and PKIs are stored. By providing the reliant party with the LDAP address of the card holder, the reliant party can check to see whether the user has an airline-issued digital certificate and whether it should allow access to its restricted services. However, before the certificate library allows the reliant party to pass it the LDAP address, there are security and authentication measures taken between the two entities beginning with step 408.

At step 408, the reliant party creates a secure authenticated connection with the certificate library using, for example, SSL Version 3 or TLS, with certificates for mutual authentication. This connection should be secure and authenticated since competitively sensitive information may be transferred between the reliant party and the certificate library. The certificate library may want to ensure that it is giving information to the proper reliant party and not to, for example, a competitor of the reliant library. The certificate library can also be charging a fee for access to its library and may want to ensure that a "member" reliant party is getting the information.

At step 410, the reliant party creates an authenticated session "on top of" the connection with the certificate library. This can be done using an LDAP Version 3 bind request, which, in turn, uses the Simple Authentication and Security Layer (SASL) authentication framework. Although the reliant party has already created a secure, authenticated connection with the certificate library, this session authentication allows for features like variable pricing and liability options for the reliant party, as well as for more flexible technical configurations. For example, the reliant party may only have a secure connection to a proxy server. In this case, the reliant party would use the LDAP bind authentication for access to the actual certificate library server. The reliant party may also have the ability to modify the type of authentication provided in order to vary the price and detail of the information requested. In another preferred embodiment, this second bind request for creating an authenticated session may not be necessary or desirable.

At step 412 the certificate library directory responds to the reliant party's bind request. The library typically responds with a message indicating that the bind was successful or that it failed. The library directory makes this determination based on access control rules defined by the certificate library directory administrator. Assuming the authentication bind was successful, the reliant party requests information, such as whether the user has a digital certificate issued by the reliant party, at the memory location indicated by the LDAP address. The reliant party does so by appending LDAP parameters to the request.

If either bind requests fail, the chip card holder is not authenticated and, consequently, may not be allowed access to reliant party services. The reliant party makes this determination by using the LDAP address contained in the chip card as the base of a query requesting information from the certificate library. The request could also be for other information such as the status of the card holder's membership, the card holder's membership level, account information, or a copy of the certificate.

At step 414, the certificate library responds to the query made by the reliant party at step 412 by supplying the requested data or any other appropriate response. This can include, for example, a message stating that the user certificate has been revoked or never existed. In the described embodiment, the certificate library has its own information access rules as to the type of information for which each reliant party may ask and details of the response to be returned. Thus, a highly tailored or customized information and authentication service can be provided to the reliant party which allows the reliant party, such as a merchant or airline, to provide specialized services to its customers.

At step 416, the reliant party presents an authentication challenge to the user. At this stage, the reliant party has information on the card holder, specifically that the card holder has an appropriate certificate and, thus, the attributes on the certificate and user public key. The reliant party must determine if the card holder is allowed to access information (or withdraw cash, make a purchase, etc.) based on the reliant party's own access control rules (separate from those of the certificate authority).

The reliant party now authenticates the card holder's claim of identity by authenticating the private key on the chip card. To do this, the reliant party sends a challenge via the IAD to the chip card. The challenge, a text string chosen by the reliant party, is sent in the form of a signing request. The chip card receives the text string unencrypted.

In one embodiment, LDAP assumes X.509 certificates are the primary means to authenticate entities. However, if the certificate library directory is to retain central control of the certificates, the information stored in the certificate should be limited or the certificate should have a comparatively short duration. Other forms of secret keys, other symmetric and asymmetric should be considered in light of the business requirements of the reliant party.

At step 418, the card holder may be prompted for a PIN to verify that the card holder is the owner of the chip card. This can be done if the chip card application and the IAD support card holder verification. This may not need to be done since the original registration authority has verified the identity of the card holder as part of the initial overhead of laying down the cryptographic infrastructure. At step 420 the card application signs the challenge sent by the reliant party using with the private key on the chip card. The resulting encrypted text string is returned to the reliant party via the IAD. At step 422 the IAD forwards the signed challenge from the chip card to the reliant party. At step 424 the reliant party opens a second authenticated bind request with the certificate library directory. This second authenticated bind request could be either a second session or a proxy bind using the original session established earlier. Upon receiving the request the certificate library uses the card holder public key to decrypt the response. If the decrypted response matches the original challenge, the certificate library can be assured the card holder and the certificate are tied together. It is also possible to have the reliant party decrypt the challenge if the certificate is returned in the original request.

At step 426 the certificate library directory responds to the reliant party bind request. If the request is successful, the reliant party can be assured that the identity of the card holder is legitimate (i.e., the card holder is who he says he is). In described embodiment, the library directory access control rules will typically allow only positive or negative response to the card. Assuming the library directory access control rules reply with a positive response, the reliant party can be assured of the card holder's identity.

At step 428, the reliant party may now grant privileged access to the card holder according to the reliant party's access control rules. For example, at this point, the card holder can access the airline web site or make a purchase from a merchant. If the reliant party requires data to be signed by the chip card application, the certificate library can either return a public key from the certificate chain to the reliant party allowing the reliant party to validate the signature.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although a PKI infrastructure using public and private keys is used to illustrate the described embodiment, other systems, such as the DES shared secret key system, can be used. In another example, although the certificate library server is described as an LDAP server, other access protocols and server types can be used to implement the certificate library. Accordingly, the present embodiments are to be considered as illustrative and not restrictive, and the invention is not to be limited to the details given herein, but may be modified within the scope and equivalents of the appended claims.

What is claimed is:

1. A method of creating a digital certificate for a user comprising:

generating a user private key and a user public key;

obtaining a set of attributes containing data pertaining to the user and useful to an issuing party issuing the digital certificate;

encrypting a combination of said user public key and said set of attributes using an issuer private key to create an encrypted data set;

creating a digital certificate containing the user public key, the set of attributes, the encrypted data set, and an issuing-party identifier;

storing the digital certificate at a user-allocated memory segment of a certificate library server;

storing said user private key and an address of said certificate library server on a chip card of said user, whereby said digital certificate is stored remote from said chip card;

creating a certificate chain using the digital certificate; and storing the certificate chain in the user-allotted memory segment of the certificate library server, wherein the certificate library server stores a plurality of said certificate chains of other said users, said certificate library server including:

a plurality of said user-allocated memory segments each being accessible by an address contained in one said chip card of one said user;

a plurality of said certificate chains issued to the one said user, wherein the plurality of said certificate chains are included in one of the user-allocated memory segments and wherein each said certificate chain is issued to the one said user by an issuer;

an issuer identifier associated with each said certificate chain that identifies the issuer on whose behalf the digital certificate is provided in the certificate library server;

a user first cryptographic key included in each said certificate chain, said user first cryptographic key having a corresponding user second cryptographic key being stored in the one said chip card of the one said user;

a set of user attributes included in each said certificate chain providing information regarding the relationship between the one said user and the issuer associated with the digital certificate chain;

and a trusted root certificate for each said certificate chain, with the corresponding trusted root differing from other trusted certificate roots stored at the corresponding user-allocated memory segment.

2. A method as recited in claim 1 further including determining which party signed the encrypted data set by retrieving a public key from another digital certificate of said certificate library server.

3. A method as recited in claim 2 further including decrypting the encrypted data set and comparing the decrypted data set with said user public key and said set of attributes.

4. A method as recited in claim 1 wherein said issuing party is at least one of a reliant party, a merchant and a service provider.

* * * * *